United States Patent [19]

Neely

[11] Patent Number: 4,641,943
[45] Date of Patent: Feb. 10, 1987

[54] PHOTOGRAPHIC CAMERA WITH ELECTRONIC FLASH HAVING PERIODICALLY DISABLED CHARGING APPARATUS

[75] Inventor: Judith L. Neely, Reading, Mass.

[73] Assignee: Polaroid Corporation, Cambridge, Mass.

[21] Appl. No.: 792,869

[22] Filed: Oct. 30, 1985

[51] Int. Cl.[4] .................... G03B 15/05; G03B 17/40
[52] U.S. Cl. ................... 354/413; 354/238.1
[58] Field of Search ................ 354/413, 235.1

[56] References Cited

U.S. PATENT DOCUMENTS

| | | | |
|---|---|---|---|
| 3,478,660 | 11/1969 | Land | 95/11.5 |
| 3,543,662 | 12/1970 | Erlichman | 95/11 |
| 3,705,542 | 12/1972 | Gold | 95/19 |
| 3,748,984 | 7/1973 | Gold | 95/19 |
| 3,779,770 | 12/1973 | Alston et al. | 96/76 |
| 3,846,812 | 11/1974 | Biber | 354/145 |
| 3,942,183 | 3/1976 | Whiteside | 354/29 |
| 3,977,014 | 8/1976 | Noris | 354/196 |
| 4,040,072 | 8/1977 | Johnson et al. | 354/173 |
| 4,134,660 | 1/1979 | Sakurada et al. | 354/289 |
| 4,188,103 | 2/1980 | Biber et al. | 354/27 |
| 4,199,246 | 4/1980 | Muggli | 354/195 |
| 4,472,041 | 9/1984 | Carcia et al. | 354/413 |

Primary Examiner—Michael L. Gellner
Attorney, Agent, or Firm—John J. Kelleher

[57] ABSTRACT

A photographic camera having a single source of internal electrical power, an electronic flash that includes a flashtube and a charging system for storing an electrical charge for subsequent discharge across the light emitting element of the flashtube, a manually actuatable self-timer for generating an exposure interval initiating electrical signal a predetermined time after the timing cycle of the self-timer has been actuated and apparatus for generating electrically produced visual and/or audible signals indicating that the self-timer is in operation is provided with apparatus for inhibiting the operation of the electronic flash charging system whenever such signals are generated in order to prevent the relatively large electrical load associated with the electronic flash charging system from changing the voltage and/or current levels available from the camera's power source and thereby preclude interferance with the proper operation of the self-timer operation indicators which are sensitive to such changes.

10 Claims, 2 Drawing Figures

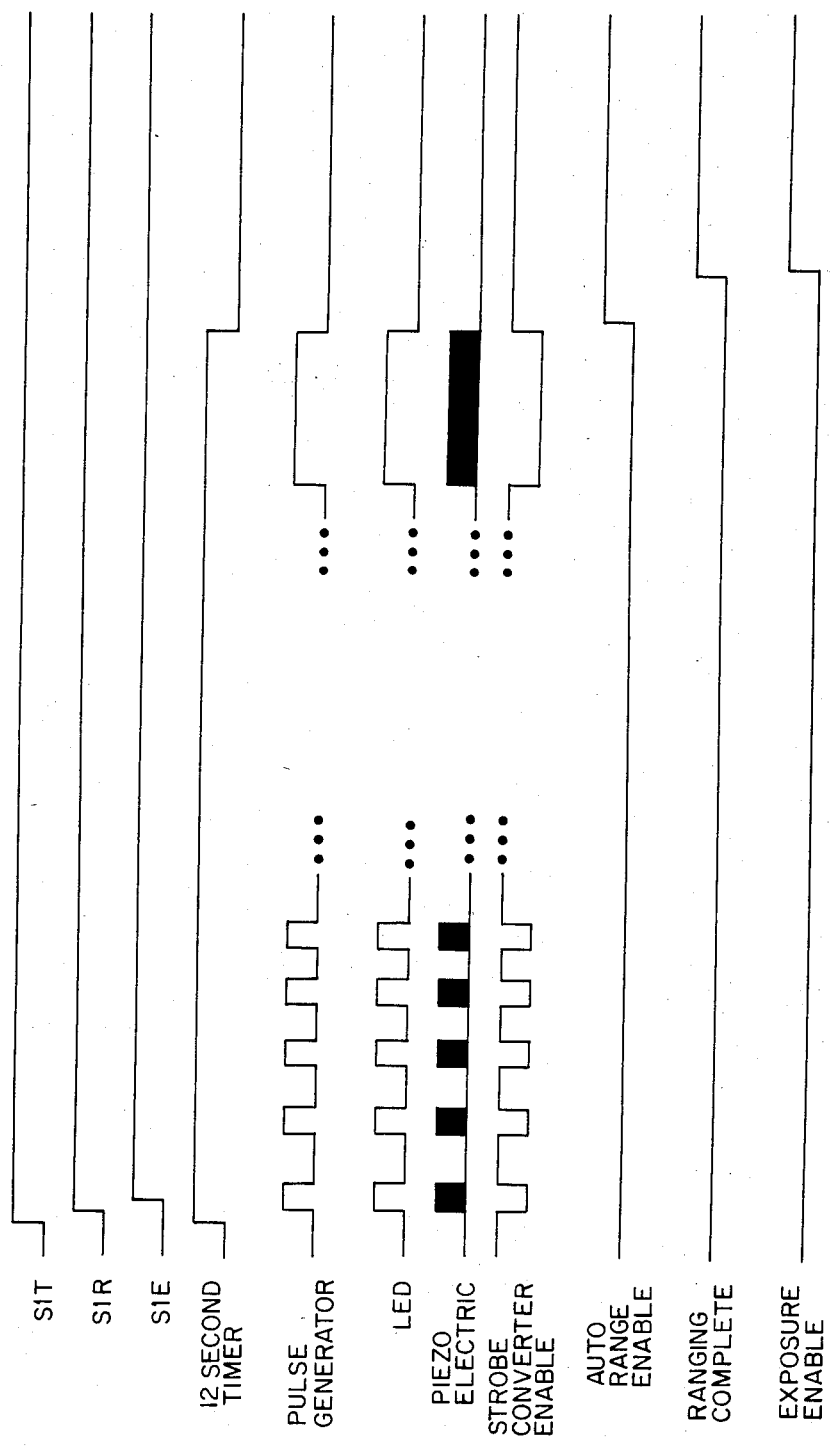

PHOTOGRAPHIC CAMERA WITH ELECTRONIC FLASH HAVING PERIODICALLY DISABLED CHARGING APPARATUS

BACKGROUND OF THE INVENTION

The present invention relates to the control of power from a power source to voltage and/or current level sensitive electrical loads or circuits in a photographic camera, in general, and to the control of electrical power to an electronic strobe from a single internal camera power source of limited capacity when said camera is operating in a self-timer mode, in particular.

It is known in the art to control the operating sequence of an automatic self-developing camera to enable a single internal battery of limited capacity to power the camera during its entire operating cycle. U.S. Pat. No. 3,846,812, for example, discloses apparatus that operates a flash camera of the automatic self-developing type so that only one operation having a significant current drain occurs at any one time. In the camera disclosed therein, the film transport motor and the electronic flash unit draw battery current at different times during the camera operating cycle.

As shown in U.S. Pat. No. 4,472,041, it is also known in the prior art to disable the film transport mechanism of a flash camera of the self-developing type at the end of an exposure interval for the purpose of enabling the electronic flash to operate in a charging mode to thereby reduce the apparent change time subsequent to the transport of a film unit from the camera without changing the overall time required to charge the electronic flash. However, inhibiting the operation of one or more camera functions while another camera function is being performed lengthens the overall time required to complete an entire camera cycle. Camera cycle time would not be lengthened and excessive power would not be drawn from a common power source at any one time if, for example, one camera function was cycled on and off during a portion of an overall camera cycle and another camera function was actuated only during that period of time when said one camera function is in its off mode of operation.

It is a primary object of the present invention, therefore, to actuate one or more functions of a photographic camera during a normal camera operating cycle without lengthening overall camera cycle time.

It is another object of the present invention to operate one or more functions of a photographic camera, where said functions are of the type having relatively large power consuming demands such that said camera functions will neither exceed the power delivering capabilities of a power source of limited capacity nor lengthen overall camera cycle time.

It is a further object of the present invention to charge an electronic strobe during the operation of a camera's self-timer without interfering with the operation of indicators showing that the camera is operating in its self-timer mode.

Other objects, features and advantages of the present invention will be readily apparent from the following detailed description of a preferred embodiment thereof taken in conjunction with the accompanying drawings.

SUMMARY OF THE INVENTION

In accordance with the present invention, a photographic camera having an internal power source of limited capacity, an electronic flash, a self-timer and means for indicating when the camera is functioning in its self-timer mode of operation is provided with a control system for inhibiting electronic flash charging during selected portions of the time period when said self-timer is in operation in order to prevent interference with the proper operation of the self-timer indicators by the electronic flash charging system. For optimum film exposure, it is essential that the electronic flash be fully charged at the end of the self-timer period of operation, just prior to the initiation of an exposure interval. In order to insure that a full charge is present at the initiation of an exposure interval, the electronic flash must be charged while the self-timer is in operation.

In the camera of the present invention, self-timer operation indicators are actuated to their on and off conditions in correspondence with a series of pulses from a pulse generator whenever the self-timer is operating. Charging the electronic flash from the camera's internal power supply during all of the time that the self-timer is operating would reduce the voltage and/or current that would otherwise be available to operate the camera's self-timer indicators. The present invention prevents such voltage and/or current reduction by charging the electronic flash between self-timer indicator pulses or when the indicators are in their off or non-indicating states.

BRIEF DESCRIPTION OF THE DRAWINGS

FIG. 2 is a system timing diagram showing the sequence of operation of components of the self-timer and strobe charging control system of the present invention in relation to other selected camera functions.

DESCRIPTION OF THE PREFERRED EMBODIMENTS

Figure 1:
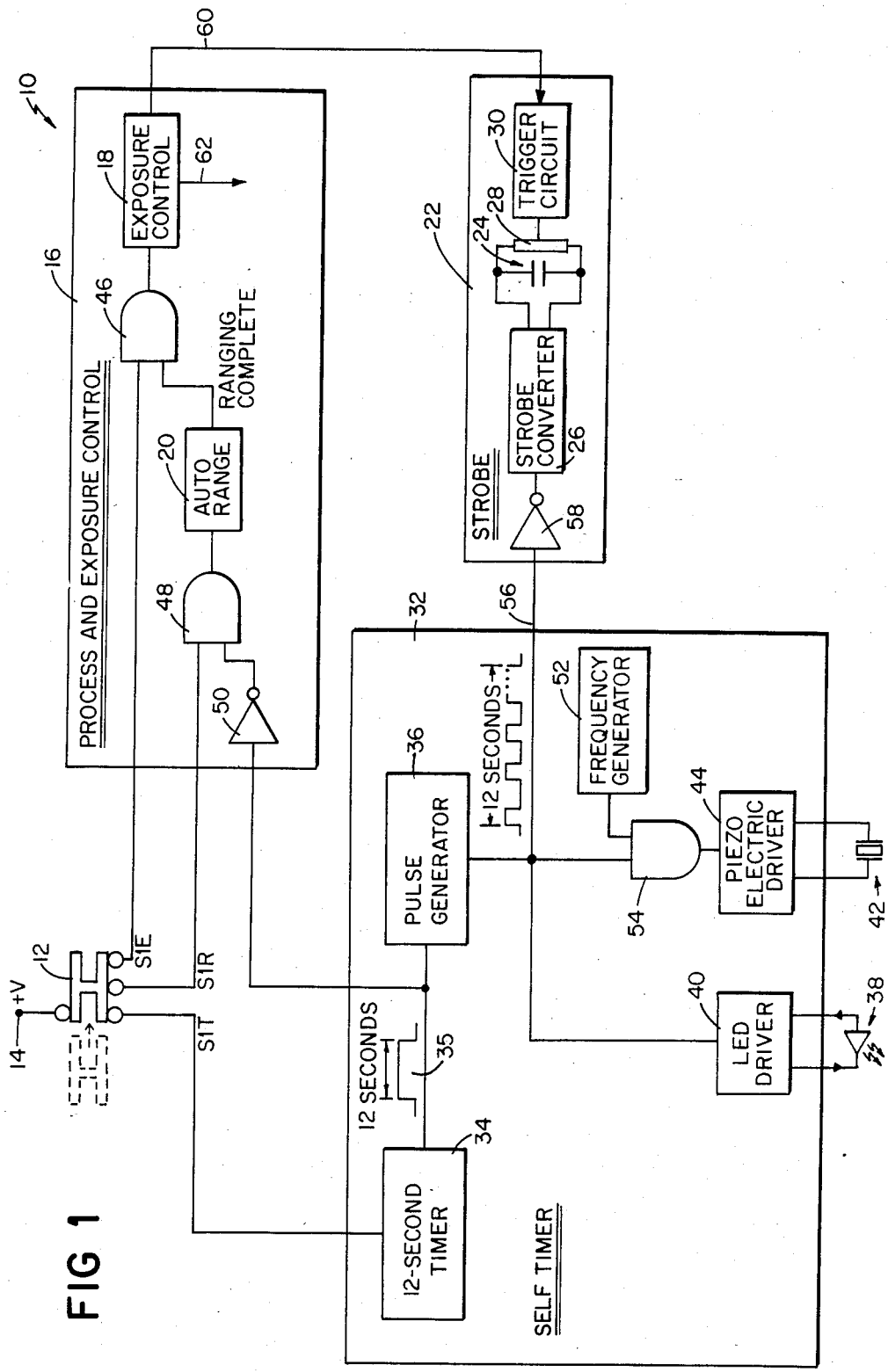
FIG. 1 is a functional block diagram of a portion of a film exposure and processing control system for a self-developing camera having the self-timer and strobe charging control system of the present invention incorporated therein.

Referring now to FIG. 1 of the drawings, there is shown at 10 a functional block diagram of a portion of a film exposure and processing control system of a photographic camera incorporating a preferred embodiment of the self-timer and electronic flash charging control system of the present invention. As shown in FIG. 1, camera system 10 includes self-timer mode select switch 12 that couples a source of electrical power connected to terminal 14 (not shown) to various electrical systems, components, etc., included within said camera system 10. The source of electrical power in system 10 is a flat battery mounted within a light-tight film cassette under a plurality of stacked film units as is described, for example, in U.S. Pat. Nos. 3,543,662; 3,705,542; 3,748,984 and 3,779,770. In this regard, camera system 10 is employed in a self-developing camera for use with a film pack of the type manufactured and sold by Polaroid Corporation as the Polaroid 600 film pack.

Camera system 10 also includes a film processing and exposure control section shown generally at 16 in FIG. 1. Film processing and exposure control section 16 includes exposure control 18. Exposure control 18 may be of any well-known type such as those embodying scanning shutter blade elements that operate to vary the exposure aperture with time during an exposure interval as taught by U.S. Pat. No, 3,942,183 entitled "Camera with Pivoting Blades", by G. D. WHITESIDE, issued Mar. 2, 1976, in common assignment herewith and now specifically incorporated herein by reference. Such scanning shutter blade mechanisms generally include a pair of counter-reciprocating shutter blade elements each having a primary aperture that traverses that optical axis of the camera during the exposure interval. The primary apertures are shaped so that upon overlying one another during counter movement of the blades, there is defined an effective exposure aperture value which increases to a maximum value in a determinate period of time.

Exposure control is provided in a well-known manner by a pair of secondary photocell apertures in respective shutter blade elements which admit scene light to a photoresponsive element in correspondence with the scene light admitted to the focal plane during shutter blade movement through an exposure cycle. The output from the photoresponsive element is directed to an integrator circuit which triggers an exposure interval upon reaching an integration level corresponding to a desired exposure value to terminate the exposure interval by returning the shutter blade elements back to their initial scene light blocking position as fully described in U.S. Pat. No. 3,942,183, supra. Exposure control 18 also includes an objective lens arrangement or assembly which may be either of the fixed or adjustable focus type for focusing image forming light rays in a well-known manner at the camera's focal plane.

Film processing and exposure control section 16 also includes ranging system 20 for sonically determining the distance to a subject to be photographed. An electrical signal representative of subject distance generated within ranging system 20 (not shown) can subsequently be employed for one or more range-related functions. Ranging system 20 is of the type described in U.S. Pat. No. 4,199,246, entitled "Ultrasonic Ranging System for a Camers" by J. MUGGLI, issued Apr. 22, 1980 and commonly assigned herewith. Ranging system 20 includes appropriate circuitry which by means of a transducer (not shown) emits a burst of ultrasonic energy toward a central portion of the photographic scene so as to be reflected from a subject positioned therein and which, upon receipt of an echo of said energy from such a subject, by virtue of the elapsed time from energy emission to echo receipt, provides an appropriate signal corresponding to this time interval and, hence, to the distance of the subject from the camera. This subject distance signal is utilized in the illustrated embodiment for controlling the firing time of electronic flash unit 22. Additionally, the sonically derived subject distance signal is also employed for focusing the camera's lens assembly (not shown) and in the latter case, an electrically energizable lens driving arrangement (not shown) would be provided for lens focusing.

Exposure control 18 is arranged to operate in synchronism with electronic flash unit 22 in any conventional manner. In one such embodiment, the shutter blade mechanism of exposure control 18 and electronic flash unit 22 are arranged to operate in either a high ambient scent intensity mode of operation where no artificial illumination is provided, or a low ambient scene light intensity mode of operation where the electronic flash is fired to provide a source of artificial illumination. Under conditions of low ambient scene light intensity where the electronic flash unit 22 is expected to be fired, the scanning shutter blade mechanism of exposure control 18 may be stopped at an aperture value corresponding to the camera-to-subject distance, with a measure of said distance being established by a focused objective lens. Systems of the aforementioned type are generally referred to as "follow-focus" systems and the maximum aperture to which the scanning shutter blade elements are allowed to open is controlled by a rangefinding or focusing system in a manner such as that disclosed in U.S. Pat. No. 3,977,014, entitled "Follow-Focus Exposure Control System with Improved Uniform Trim Control", by P. R. NORRIS, issued Aug. 24, 1976, in common assignment herewith and now specifically incorporated herein by reference.

In another alternate embodiment, exposure control 18 need not operate to actually stop the opening shutter blade movement at a maximum effective exposure aperture as determined by the rangefinding or focusing system of the camera, but may instead vary the time at which the flash if fired during the opening shutter blade movement as determined in correspondence with the camera's rangefinding or focusing system. Since the duration of the flash is short in comparison to the time required for the shutter blade mechanism to scan from its scene light blocking position to a maximum exposure aperture defining position, the aperture defined by the shutter blade elements at the instant of electronic flash firing for practical purposes constitutes the effective aperture by which the exposure occurs. Such a system is more fully described in U.S. Pat. No. 3,478,660, entitled "Photographic Apparatus with Flash Exposure Control System", by E. H. LAND, issued Nov. 18, 1969, in common assignment herewith and now incorporated herein by reference. This range responsive electronic flash firing system can also be utilized in conjunction with a sonic rangefinding device as is more fully described in U.S. Pat. No. 4,188,103, entitled "Range Synchronized Flash Photographic Apparatus and Method for Achieving Optimum Exposure", by C. H. BIBER ET AL, issued Feb. 12, 1980, in common assignment herewith and now incorporated herein by reference.

As noted above, system 10 also includes electronic flash unit 22. Electronic flash unit 22 includes main storage capacitor 24 which may be charged up to an operating voltage by a conventional voltage converter circuit as shown generally at 26. Voltage converter 26 operates in a conventional manner to convert a DC voltage as may be derived from the camera power supply connected to terminal 14 which may be in the order of 6 volts to a suitable electronic flash operating voltage such as 350 volts. A flash tube 28 is connected in parallel relation with respect to the storage capacitor 24 and may be ignited by a trigger circuit 30 of any conventional form which is set in operation by the closing of conventional synchronous contacts of the exposure control 18 in the usual manner. As will be readily understood, the electronic flash unit 22 may be formed as an integral part of the camera or, alternatively, may be made as a detachable accessory, if so desired.

Camera system 10 also includes a self-timer shown generally at 32 in drawing FIG. 1. Self-timer 32 includes a 12-second timer 34. When a constant voltage is applied to the input of timer 34, a voltage appears at the output of said timer 34 for a period of 12 seconds from the time that the input voltage is applied in the form of 12-second output pulse 35.

Pulse generator 36 also forms a part of self-timer 32. When a constant voltage is applied to the input of pulse generator 36 a train of pulses is provided at the output of said pulse generator 36. The pulse train at the output of pulse generator 36 consists of a series of 17 pulses. Each of the first 16 pulses are approximately 250 milliseconds in duration whereas the last pulse is of 2 seconds duration. The time between each successive pulse is of a progressively shorter duration beginning with a time between pulses of approximately 750 milliseconds and ending with a time between adjacent pulses of approximately 100 milliseconds.

Visual and audible means are provided for the purpose of indicating when self-timer 12 is operating. The visual means indicative of self-timer 12 operation consists primarily of light-emitting diode (LED) 38 and LED driver 40. LED 38 is energized by LED driver 40 for the entire period of time that a voltage at the input to driver 40 equals or exceeds a predetermined magnitude. Similarly, the audible means indicative of self-timer 12 operation primarily consists of piezoelectric buzzer 42 and piezoelectric buzzer driver 44. Piezoelectric buzzer 42 is energized by driver 44 for the purpose of producing a continuous vibratory sound indicative of self-timer 12 operation for the period of time that a voltage at the input to piezoelectric driver 44 equals or exceeds a predetermined magnitude.

OPERATION

Normally, the self-timer mode of operation is selected when the camera operator is to be included in the scene to be photographed and another camera operator is not available to actuate a conventional picture-taking sequence initiating shutter button. With the obvious exception of self-timer 32, the functions initiated by said picture taking sequence initiating shutter button are approximately the same as those initiated by self-timer mode select switch 12.

With additional reference to FIG. 2 of the drawings, which is a timing diagram showing the sequence of operation of components of self-timer 32 in relation to other selected camera functions, a self-timer-controlled picture taking sequence mode is initiated by manually positioning self-timer switch 12 from the position shown in phantom to the position shown in solid lines in drawing FIG. 1. As shown in drawings FIGS. 1 and 2, when switch 12 is actuated to its solid line or closed position, the voltage source connected to terminal 14 is thereby connected to terminals S1T, S1R and S1E of said switch 12 and to an input of AND gate 46, AND gate 48 and 12-second timer 34. When a voltage is applied to the input of timer 34, a voltage will subsequently appear at its output for a period of 12 seconds. The output voltage of timer 34 is applied to inverter 50 which, in turn, inhibits AND gate 48 and the operation of ultrasonic ranging system 20. Exposure control 18 is also inhibited for the period of time that a voltage is present at the output of timer 34 because AND gate 46 will not be satisfied during this time interval.

The output of timer 34 is also applied to the input of pulse generator 36 which, in turn, produces a train of 17 output pulses. As noted above, these pulses are of equal duration except for the last one which is considerably longer, with the time between pulses being progressively shorter. This pulse train output is applied to LED driver 40, causing said driver to energize light-emitting diode 38 and thereby provide a light source that flashes in correspondence with the pulse train output from pulse generator 36 or a visual indication that self-timer 32 is operating. The pulse train from pulse generator 36 together with the output of frequency generator 52 is also applied to the input of piezoelectric driver 44 through AND gate 54. The combination of frequency generator 52 and the pulses from the output of pulse generator 36 cause piezoelectric buzzer 42 to produce a pulsating vibratory sound in correspondence with the pulse train from pulse generator 36. Progressively shortening the time between successive pulses from pulse generator 36 and them terminating the pulse train with a relatively long pulse serves to heighten the fact that a picture taking exposure interval is about to be initiated for those interested individuals included within the photographic scene.

During the self-time mode of operation, strobe converter 26 of electronic strobe 22 charges storage capacitor 24 so that said capacitor will be fully charged at the end of the self-timer time delay interval (12 seconds) and at the beginning of an exposure interval for proper film exposure. If storage capacitor 24 was charged before the initiation of self-timer 32, the overall time required to complete an entire exposure cycle would be lengthened. Similarly, it storage capacitor 24 was charged at the completion of the self-timer interval, the time required to complete a subsequent exposure interval would, in effect, also be lengthened by the time required to charge said capacitor 24. If storage capacitor was charged during the entire self-timer interval, the electrical load presented to the camera's sole power source would be of sufficient magnitude to substantially lower the level of voltage and/or currrent that would then be available to operate LED 38 and piezoelectric buzzer 42. As a consequence, LED 38 would produce a lower light output and piezoelectric buzzer would produce both a change in piezoelectric vibration frequency and sound output intensity during this interval of time. A lower light output would be less visible and the reduced sound output might not be heard by subjects within the scene being photographed which, in turn, might reduce or even nullify the effectiveness of the self-timer operation indicators. The present invention precludes such a possibility by charging electronic strobe capacitor 24 between LED and piezoelectric buzzer actuation pulses produced by pulse generator 36 during the self-timer mode of operation.

As explained above and as shown in drawing FIGS. 1 and 2, when a voltage pulse is present at the output of pulse generator 36, LED 38 and piezoelectric buzzer 42 are actuated. However, the pulse train output of pulse generator 36 is also applied to capacitor-charging strobe converter 26 through path 56 and inverter 58. The function of inverter 58, therefore, is to disable or inhibit the charging function of strobe converter 26 whenever a voltage pulse is present at the input to LED driver 40 and piezoelectric driver 44. Conversely, inverter 58 enables strobe converter 26 within electronic strobe unit 22 for capacitor 24 charging purposes for the periods of time between adjacent pulses generated by pulse generator 36 during the 12-second time out interval of timer 34. The effect of such an arrangement is that self-timer 32 operation indicators 38 and 42 and the charging of capacitor 24 within electronic strobe unit 22 can be accomplished during the same self-timer operation interval, which in the preferred embodiment is 12 seconds in duration, without either of these functions having any effect on the other.

At the completion of the 12-second time delay interval associated with self-timer 32, the output voltage of timer 34 within said self-timer 32 drops to zero, thereby causing inverter 50 to enable AND gate 48 and ultrasonic ranging system 20 at the output thereof. When the distance to the subject to be photographed has been determined by ranging system 20, AND gate 46 enables exposure control 18. At the appropriate time after being enabled, exposure control 18 transmits a strobe-triggering signal to trigger circuit 30 through path 60 and another signal through path 62 to a film transport system (not shown) that will cause an exposed film unit to be transported out of the self-developing camera in which the film unit is located in the manner described in, for example, U.S. Pat. No. 4,040,072, entitled "Shutter Latch Arrangement Releasable Through Shutter Blade Actuation and Resettable Through Film Advancement", by B. K. JOHNSON, et al, issued Aug. 2, 1977, in common assignment herewith and now incorporated herein by reference.

It will be apparent to those skilled in the art from the foregoing description of my invention that various improvements and modifications can be made in it without departing from its true scope. The embodiments described herein are merely illustrative and should not be viewed as the only embodiments that might encompass my invention.

What is claimed is:

1. Apparatus for inhibiting the charging of an electronic flash in a photographic camera having a self-timer, whenever a particular function is generated during self-timer operation, comprising:
   a manually actuatable self-timer for generating a film exposure sequence initiating electrical signal a predetermined time after the timing cycle of said self-timer has been initiated;
   an electronic flash including a flashtube and a charging system for storing an electrical charge for subsequent discharge across the light emitting element of said flashtube during an exposure interval;
   means responsive to the operation of said self-timer for generating a particular function during the operation of said self-timer; and
   control means for enabling the electronic flash to operate in a charge mode during said self-timer timing cycle and for inhibiting the operation of said charging system during said timing cycle whenever said particular function is generated.

2. The apparatus of claim 1 wherein the said particular function generated during the operation of said self-timer is a visual signal indicating that the self-timer is in operation.

3. The apparatus of claim 2 wherein the said visual signal indicating that the self-timer is in operation is a source of light from a light-emitting diode.

4. The apparatus of claim 2 wherein the said particular function generated during the operation of said self-timer is an audible signal indicating that the self-timer is in operation.

5. The apparatus of claim 4 wherein the said audible signal indicating that the self-timer is in operation is a vibratory sound produced by a piezoelectric buzzer.

6. Apparatus for inhibiting the charging of an electronic flash in a photographic camera having a self-timer, whenever an indicator indicative of self-timer operation is activated, comprising:
   a manually actuatable self-timer for generating a film exposure sequence initiating electrical signal a predetermined time after the timing cycle of said self-timer has been initiated;
   an electronic flash including a flashtube and a charging system for storing an electrical charge for subsequent discharge across the light emitting element of said flashtube during an exposure interval;
   means responsive to the operation of said self-timer for generating a visual and/or audible signal indicative of self-timer operation; and
   control means for enabling the electronic flash to operate in a charge mode during said self-timer timing cycle and for inhibiting the operation of said charging system during said timing cycle whenever a self-timer operation indicator is activated.

7. The apparatus of claim 6 wherein said control means includes a pulse generator for producing a train of pulses in response to the operation of said self-timer and wherein said charging system in inhibited and said self-timer operation indicator is activated for the duration of each of the pulses forming said pulse train.

8. The apparatus of claim 7 wherein the period of time between adjacent pulses in said pulse train becomes progressively shorter.

9. The apparatus of claim 6 wherein the visual signal responsive to the operation of said self-timer and indicative of self-timer operation is produced by a light emitting diode.

10. The apparatus of claim 6, wherein the audible signal responsive to the operation of said self-timer operation is provided by a piezoelectric buzzer.

* * * * *